United States Patent [19]

Leiber

[11] 3,756,666
[45] Sept. 4, 1973

[54] HYDRAULIC BRAKE SERVO ARRANGEMENT

[75] Inventor: Heinz Leiber, Leimen, Germany

[73] Assignee: Teldix G.m.b.H., Heidelberg, Germany

[22] Filed: June 2, 1972

[21] Appl. No.: 259,031

[30] Foreign Application Priority Data
June 3, 1971   Germany................... P 21 27 536.5

[52] U.S. Cl............................... 303/10, 303/21 F
[51] Int. Cl............................................. B60t 13/16
[58] Field of Search ........................... 303/10, 21 F

[56] References Cited
UNITED STATES PATENTS
3,601,452   8/1971   Brunner............................ 303/10 X
3,640,587   2/1972   Milner et al...................... 303/10 X
3,713,708   1/1973   Michellone........................ 303/21 F

*Primary Examiner*—M. Henson Wood, Jr.
*Assistant Examiner*—John J. Love
*Attorney*—George H. Spencer, Jay M. Finkelstein et al.

[57] ABSTRACT

A hydraulic brake servo arrangement for vehicles including a brake master cylinder, a pump, a secondary circuit and an antiskid system having an accumulator included therein. The pump delivers brake fluid from the master cylinder through the secondary circuit to the vehicle brake or brakes. The servo arrangement is adapted to temporarily disconnect the pump from the master cylinder and connect it to the accumulator so that the pump acts both as a brake servo and a return pump for the anti-skid system.

21 Claims, 5 Drawing Figures

HYDRAULIC BRAKE SERVO ARRANGEMENT

BACKGROUND OF THE INVENTION

The present invention relates to a hydraulic brake servo arrangement for vehicles.

Such a hydraulic brake servo has been described in applicant'German Pat. application No. P 1 800 633. laid open on May 27 1970.

The brake servo therein disclosed includes a master cylinder, a pump, the input of which is connected with the master cylinder, and a secondary conduit system(s) leading to the brake or brakes. The cylinder has a piston whose operation is controlled by a primary force, which is applied as a pedal force by the vehicle operator. The master cylinder supplies, during the operation of the piston, hydraulic fluid into the secondary conduit system(s) and thereby into the brake or brakes. The brake servo arrangement also includes a return valve which is controlled by the primary force and which connects the secondary conduit system(s) which an inlet conduit.

The brake servo arrangement of the aforementioned patent application has as one of its objects replacing hitherto used vacuum or compressed air brake servos for hydraulic braking systems in motor vehicles with smaller and more quickly responding devices. The requirement in the known vacuum or compressed air brake servos that in case of an auxiliary force failure owing to a breakdown, at least the primary pressure would be available as a secondary pressure, also applies to the brake servo disclosed in the aforementioned application.

A pump which is particularly suitable for the brake servos being considered is the so-called free piston pump. This pump has at least one freely movable piston which is driven only in one direction, the piston moving in the opposite direction only under the action of the hydraulic fluid of the brake system. The driving force for the piston may be an eccentric, or a reciprocating slide block with eccentric drive. The piston operates in a cylinder to which a suction valve and a pressure valve are connected, in the usual manner. However, as already mentioned, the suction valve is not a suction valve in the sense that a vacuum is formed at its inlet. The freely movable piston stops unless a pressure medium is forced into its cylinder through the suction valve from a source external to the pump.

An arrangement having a normal eccentric or crank drive instead of the non-positive piston drive, may be used to produce the same effect. In addition, a so-called control chamber with a variable volume can be provided, with a movable spring-biased wall, e.g., a piston, which normally moves the valve closure member of the suction valve off its seat by means of a pin. Only when this chamber is filled on the primary side, that is, on the master cylinder side of the chamber, with a pressure medium, causing the movable wall to move back and to cause its pin to disengage the valve closure member of the suction valve, can this valve close. Thereafter, the pump can generate a pressure in the secondary conduit. Thus, a pump which does not actually have a suction stroke but merely a delivery or power stroke which delivers a pressure medium in response to the movement of the master cylinder piston is essential. In principle, a conventional pump could also be used. That is, the conventional pump would be connected to the drive when pressure medium is to be supplied.

The return valve must be controlled by the primary pressure, that is, the pressure developed between the pump and the master cylinder, in such a way that it closes at a comparatively low primary pressure, and is then capable of withstanding even maximum secondary pressures. This may be achieved, for example, by means of a piston having a large working area against which the primary pressure acts, with the piston acting on a closure member which closes a bore of small cross section. It is also possible to use a magnetic valve which is energized from a normally open position to a closed position by a pressure switch at a predetermined primary pressure. Instead of being controlled by the primary pressure, the valve may also be operated by the primary force, e.g., by the brake lever.

The applications of a hydraulic brake servo usually make it necessary to limit the maximum pressure involved. In the aforementioned German application this was realized through the use of a piston pump having two parts which are elastically interconnected. In this way, the drive is not jammed when the actual piston can no longer move as a result of the very high pressure developed, because the driven part of the piston may move towards the other interconnected part of the piston by tensioning the elastic link between the parts.

Another possibility for limiting the pressure involved consists in disconnecting or decoupling the pump drive when a certain secondary pressure has been reached. With an electronic pump drive, for example, the circuit of the drive motor may be broken by a pressure switch set at the permissible maximum pressure. In addition, the return valve can be constructed in such a way that it no longer provides a seal above a certain maximum pressure in the secondary circuit. The same result can be achieved by the use of a simple pressure relief valve between the secondary and primary circuits.

Where it is desired that the secondary pressure should be sensed at the control member so as to provide "feel" on the piston of the master cylinder, as in known proportional pressure brake servos, the master cylinder piston may be simply acted upon by a spring force which increases with rises in the volume of brake fluid expelled from the master cylinder. According to a further feature, this reaction of the secondary pressure may also be achieved by using a master cylinder with a stepped piston, forming two mutually divided chambers in conjunction with a suitably stepped cylinder. The chamber with the larger cross section is used as the master cylinder proper and is connected to the primary conduit, while the other chamber is connected to the secondary conduit so that the secondary pressure acts on this small cross section of the master cylinder piston.

At least in the field of motor vehicles, the arrangement proposed in the aforementioned German application offers a large number of advantages over and above the known art. A space saving as compared with vacuum servos of a ratio of 1:20 may be expected. It should be particularly stressed that such a hydraulic servo may also be used where a vacuum servo cannot be considered owing to its size, e.g., in braking systems for trucks. There, hydraulic systems could replace the hitherto widely used compressed air systems.

Furthermore, in motor cars such a brake servo may find useful application. It is known that hitherto vehicles with diesel engines had to be provided with additional vacuum pumps for the usual vacuum servos, because a diesel engine does not produce a sufficient vacuum for operating the servos. A rotating drive is, however, available as an auxiliary force in every vehicle.

In the case of an electric motor, it is possible to brake with servo assistance even when the engine of the vehicle is shut off, since the pumps operate at very high speeds and the delivery is comparatively small, so that the secondary pressure rises practically synchronously with the primary pressure. In known brake servos operating with vacuum or compressed air, a clear time delay in the rise of pressure on the secondary side may be observed, probably due to the flow resistance occurring during the displacement of larger quantities of air.

If non-uniformity of pump delivery should be undesirable where a single piston per braking circuit is used, it is possible to use several mutually phased pistons, together with their valves, in parallel operation. With a free piston pump directly driven by an eccentric, the pistons may be positioned at equal angular spacings radially to the axis of the eccentric drive. However, a parallel arrangement of the pistons will usually be preferred in which case several coaxial association eccentrics are mutually offset by corresponding angles.

If an anti-skid control system is used with a valve arrangement which permits the brake fluid to flow outwardly from the brake cylinders when a tendency to wheel lock occurs, an additional pump for return of the brake fluid is necessary.

SUMMARY OF THE INVENTION

The present invention has as one of its objects to provide a hydraulic brake servo arrangement in which the additional return pump for the anti-skid system is eliminated.

It is also an object of the present invention to provide a hydraulic brake servo arrangement for use with trailer vehicles in which the primary servo arrangement is energized as a result of the force applied to the trailer by the tractor when the tractor is braked.

These and other objects are achieved by a hydraulic brake servo arrangement for controlling the brakes of vehicles, including a master cylinder, a pump connected to the master cylinder, at least one brake, a secondary circuit leading from the pump to the brake, the pump delivering, under the control of the master cylinder, brake fluid to the brake through the secondary circuit, an anti-skid system, an accumulator chamber, and means for temporarily disconnecting the pump from the master cylinder and connecting the pump to the accumulator chamber so that the pump acts both as a brake servo unit and a return pump for the anti-skid system.

Further according to the invention, there is provided a hydraulic brake servo arrangement for vehicles including a master cylinder having a piston, a pump with an inlet feed, which is connected to the master cylinder, and a piston which is acted upon by a primary pressure developed between the master cylinder piston and the pump piston, at least one brake, a secondary circuit extending between the pump and brake through which hydraulic fluid is delivered to the brake during operation of the master cylinder piston, a return valve connecting the secondary circuit with the inlet feed and controlled by the primary pressure, an anti-skid system including an accumulator chamber, at least one release valve which is connected to the secondary circuit for lowering the braking pressure by releasing brake fluid, if the braked vehicle wheel shows a tendency to lock, into the accumulator chamber, and means for temporarily disconnecting the master cylinder from the pump and making a connection between the accumulator chamber and the pump, so that the accumulated brake fluid can be returned to the inlet feed.

Preferably, the disconnection of the master cylinder and the pump, and the connection of the accumulator chamber and the pump, are effected at a predetermined stored volume of the accumulator chamber. A valve may be provided for the disconnection and a further valve may be provided for the connection. Alternatively, a single two-way valve may be used. The valves or the single two-way valve may be controlled through a mechanical link by the piston of the accumulator chamber. The mechanical connection may also be replaced by a switching arrangement controlled by the position of the accumulator piston which switches the valves or valve. Instead of controlling the disconnection and connection by means of the stored volume of the accumulator, it might also be possible for example, to measure the opening times of the control valves of the anti-skid system and to determine, from this measurement, and from the storage data of the accumulator and the various valve data, a time during which the valve or valves must be switched.

The solution according to the invention obviates the need for having to provide an additional return pump for the brake fluid. This saving is important for an anti-skid control system. Here it should be noted that the accumulator chamber is not an additional element in the arrangement of the present invention in comparison with other anti-skid control systems with a return pump. The accumulator is necessary for the return delivery of brake fluid. According to the invention, therefore, the pump has a double function, namely, to serve as a brake servo and as a return pump.

In order to avoid an excessive pressure on the brakes or on the closed wheel locking control valves, it is more advantageous either to form the pump piston of two elastically connected parts, or to connect the secondary system, from a point situated before the control valves, to the accumulator chamber through one or through several series-connected pressure relief valves, opening, e.g., at 150 atmospheres.

Preferably, the pump is driven by an electric drive fed by the generator and/or the battery of the vehicle. Accordingly the generator and battery auxiliary energy source for the system. For ensuring the servo action and the return action of the pump, the pump drive may be made redundant, at least for those parts liable to breakdown. The drive may be an electromagnet, but preferably an electric motor will be used which may be monitored for safety reasons. For safety reasons, the drive may have, for example, a double collector or it may be a motor with two rotors, but with common bearings and magnets. Also, two separate motors working on the same shaft are possible, although such an arrangement would be somewhat expensive.

The response characteristics of modern motors, e.g., a disc rotor type d.c. motor, are good enough to meet the requirement of only a brief response delay in braking. The motor or the electromagnet may be energized, for example, under the control of the brake pedal.

For the double use proposed, the pump may be constructed as a free piston pump. The pressure amplification produced by the pump can here be proportional to the volume of the pressure medium, corresponding substantially to an amplification which is a function of the travel of the pedal. To provide feel for the vehicle operator, a feedback of the amplified pressure might be necessary. This can be achieved by feeding back the pressure existing at one of the wheel brakes to the master cylinder.

It is also possible according to the present invention for the pump pistons of several braking circuits of a vehicle to be driven by the same drive. It should also be mentioned that with the use of several valve arrangements for protection against wheel locking in one braking circuit, the accumulator chamber may be common to all these valves.

With regard to the anti-skid control, it is sufficient to note that single wheel control, that is control of the wheels of one axle according to "select-low" or "select-high" or the like, may be used. This will not affect the construction according to the invention.

Amongst its many uses, the present invention may also be used for braking the wheels of a trailer of a tractor-trailer vehicle. In this case the tractor is provided with actuating means which energizes the pump of the hydraulic arrangement according to the present invention as a result of the force applied to the trailer by the tractor when the tractor is braked.

Finally, it should be mentioned that the pump, the valves, and the accumulator chamber, i.e., all hydraulic parts are preferably combined to form a single unit or block.

DESCRIPTION OF THE PREFERRED EMBODIMENTS

Figure 1:
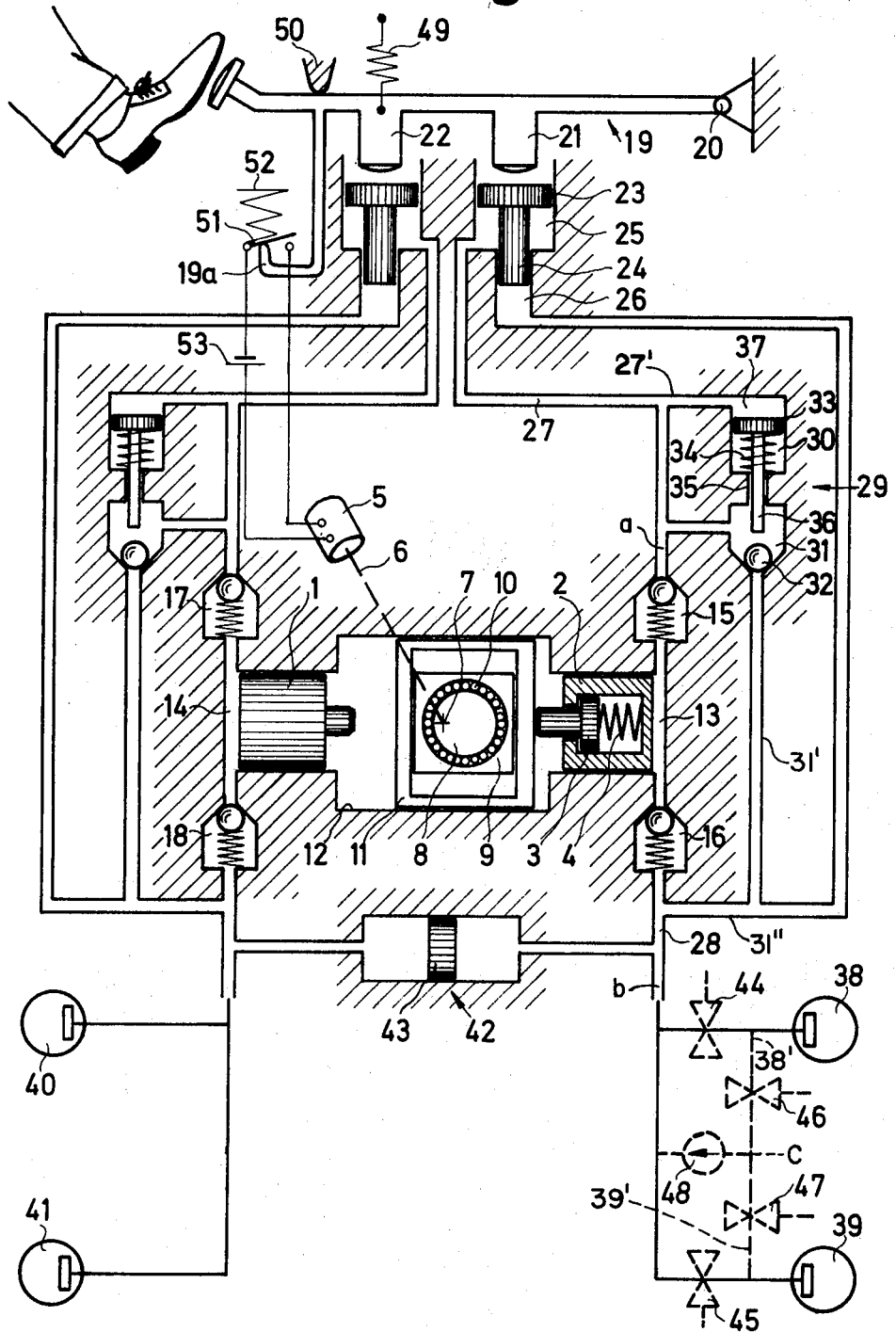
FIG. 1 diagrammatically illustrates a two-circuit braking system with a free piston pump.

Referring now more specifically to FIG. 1, two identical braking circuits are shown between which a free piston pump is connected. The free piston pump includes two pistons 1 and 2, of which one is shown in side elevation, and the other in cross section. Within the piston 2, a plunger 3 is displaceably mounted and is normally held by a compression spring 4 in the position shown. A drive motor 5, shown diagrammatically, rotatably drives an eccentric 8 about a pivot 7 through a mechanical connection, represented by the broken line 6. The mechanical connection can be of any well-known type. Mounted on the eccentric 8, by means of a needle bearing, is a slide block 9 which is preferably constructed to have a square peripheral outline. The individual needles of the bearing are shown at 10. The slide block 9 moves up and down in a frame 11 adapted to be displaceable to the right and left with respect to the parallel guide surfaces 12. The frame 11 acts on the plungers 3 of the pistons 1 and 2 which are actuated thereby.

The righthand piston 2 closes a pressure chamber 13 which has a suction valve 15 and a delivery valve 16 connected therewith. Similarly the lefthand piston 1 closes a chamber 14 which has a suction valve 17 and a delivery valve 18 connected therewith.

Of the two identical braking circuits, the circuit on the right will be described in detail. A brake lever 19 pivoting about a pivot 20 is shown at the top of FIG. 1. Two plungers 21 and 22 formed on the lever 19 act on two master cylinder pistons, constructed in the present case as stepped pistons each composed of a large diameter part 23 and smaller diameter part 24, and assembled within a common housing, shown cross-hatched. The common housing contains annular chambers 25 and 26, with the cross section of the annular chambers 25 being larger than that of the chambers 26. Each annular chamber 25 acts as a master cylinder and communicates through a primary conduit 27 with a respective suction valve 15 or 17 while each chamber 26 communicates with a secondary conduit 28 connected to a respective delivery valve 16 or 18. The two master cylinder pistons seve as metering pistons for developing a pressure within the primary conduit.

A return valve 29 is divided into a chamber 30 and a chamber 31. The chamber 31 is constructed as a nonreturn valve and contains a ball 32 which normally closes the funnel-shaped bottom of the chamber 31. The chamber 31 is connected at its funnel-shaped bottom through conduits 31' and 31'' with the secondary conduit 28, while a branch 27' of the primary conduit 27 terminates laterally in a third chamber 37. The ball 32 blocks the flow from the primary conduit 27 to the secondary conduit 28 through the chamber 31. The chamber 30 contains a displaceable piston 33 held normally in the position shown by a compression spring 34. A pin 36 mounted on the piston 33 projects through a connecting bore 35 into the chamber 31. Although the pin 36 is displaceable in the bore 35 its fit therein is tight so that no equalization of pressures between the chambers 30 and 31 is possible through the connecting bore 35. The top of the piston 33 closes the third chamber 37.

As an alternative, the return valve 29 providing a connection between the primary and secondary circuits may be replaced by a normally open magnetic valve (not shown) which closes with a slight pressure rise in the previously connected circuits. A pressure switch (not shown) would be utilized to control the magnetic valve, which must be arranged in the primary circuit.

The further course of the secondary conduit 28 is only indicated by means of a single thick line. It leads, after a further division, to two diagrammatically shown wheel brakes 38 and 39, for example, the rear wheel brakes of a motor vehicle. The wheel brakes 40 and 41 on the front wheels of the vehicle are actuated by the other brake circuit shown on the left side of FIG. 1. As already mentioned, the parts of the second brake circuit are identical to those of the first brake circuit already described, so that a description and designation of the individual parts is unnecessary.

In order to provide additional safety, the two brake circuits must be completely separated. However, installations exist in which, owing to different lengths of the two brake circuits, their pressure-volume curves are different, so that different pressures would build up in the two brake circuits. In order to prevent this from happening it might be desirable to provide an equalizing chamber, such as 42 in FIG. 1. The equalizing chamber 42 is a simple cylinder 42' whose chamber communicates with the secondary conduits 28 of both brake circuits. A freely movable equalizing piston 43 can move to and fro in the cylinder 42'. This makes it possible to maintain the pressure in one circuit if a brake conduit fractures in the other circuit as well as, under normal conditions, to provide pressure equalizations between the two circuits. In the former case, the equalizing piston 43 assumes one of its two end positions.

Finally, the valves and the return pump of a known anti-skid control system, are shown by broken lines. The secondary conduit 28 contains, upstream of the wheel brake cylinders 38 and 39, normally open inlet valves 44 and 45, respectively. Between the secondary conduit 28 and the outlet conduits 38' and 39', shown by broken lines, of the wheel brake cylinder branches a return pump 48 is situated. The outlet conduits 38' and 39' are normally closed by outlet valves 46 and 47. The automatic pressure drop which occurs in the event of an anitcipated locking of the wheels is caused by closing the inlet valve associated with the wheel in question and opening the outlet valve thereof. The pressurized fluid is then returned by the return pump 48 into the secondary conduit 28. The inlet and outlet valves, which can suitably be magnetically operated, are controlled as a function of the individual rotational behavior of the wheels and this control is described in detail in the Offenlegungsschriften No. 1655 454 and 1 755 906.

The drive motor 5 is controlled by the movement of the brake lever 19. In the same way, it could also be controlled by a pressure switch in the primary circuit, possibly by the switch controlling the magnetic return valve if this type of return valve is used. So long as the brake pedal 19 rests under the action of a tension spring 49 against a stop 50, a hook 19a mounted on the brake pedal 19 pushes a switch contact 51 upwards against the force of its holding spring 52. In this position, the supply of current from a battery 53 to the motor 5 is interrupted. When the hook moves down, the switch contact closes and the motor 5 is energized.

The operation of the arrangement of FIG. 1 will now be explained with particular reference to the brake circuit shown on the right:

In the inoperative position shown, the brake pedal 19 rests against its stop 50 and all conduits and chambers of the braking system are de-pressurized. When the brake pedal 19 is actuated, the contact 51 is closed and the motor 5 starts immediately before the plungers 21 and 22 act on the master cylinder pistons 23. It should also be noted that the free piston pump is started without load because its two pistons 1 and 2 when in their left and right end postions, respectively, enable the eccentric 8 and slide block 9 to move the frame 11 to and fro without resistance. These movements are preferably very fast. An eccentric speed of the order of magnitude of 6,000 r.p.m. has been found suitable.

During the further depression of the brake pedal 19, the master cylinder pistons 23 are displaced downwardly by the plungers 21 and 22. During this downward movement, a slightly increased pressure is built up in the annular chambers 25, which is sufficient to push each piston 35 with the pin 36 downwards against the weak spring 34, so that the ball 32, which is already pressed against its seat with between 2 to 10 atmospheres of pressure, is further pressed against its seat with such a force that return flow of the fluid from the secondary circuit 28 into the primary circuit 27 becomes impossible even with maximum possible pressures existing in the secondary circuit 28. This result may be achieved without difficulty by suitably dimensioning the cross section of the piston 33 relative to the ball 32 and the cross section of its seat.

Thus, the return valve 29 can be closed by a relatively low primary pressure and remain closed even against high secondary pressure. The fluid pressure force against the lower end of pin 36 is negligible.

As a further consequence of the slight increase in pressure in the primary circuit 27, the ball of the suction valve 15 is displaced downwardly out of engagement with its seat so that pressurized fluid flows into the chamber 13. As a consequence, the pump/piston 2 engages against the frame 11 and moves therewith when the frame 11 moves o the left. However, the piston 2 is immediately thereafter driven back to the right by the rapid oscillation of the frame 11, so that the pressure medium passes from the chamber 13 through the pressure valve 16 into the secondary conduit 28. A pressure builds up in the secondary conduit 28 and causes the brakes to be applied.

During this pressure rise, the comparatively stiff spring 4 first transmits the movement of the plunger 3 to the piston 2 without elastic deformation, i.e. without itself compressing. However, during the continuing downward movement of the metering piston, and the steady increase in pressure in the secondary circuit 28, the spring 4 is increasingly compressed during each cycle of movement of the piston 2, until finally the movement of the piston 2 ceases and the only relative movement occurs between the plunger 3 and the piston 2. Thus, the dimensioning of the spring 4 governs the maximum possible pressure in the secondary circuit 28. Apart from this, the pressure builds up to the extent to which the master cylinder metering pistons are depressed.

When maximum pressure exists in the secondary circuit 28 and the chamber 13 (as in known hydraulic braking installations this pressure amounts to about 120 to 160 atmospheres), a substantially lower pressure exists in the primary conduit 27. This lower pressure is sufficient on the one hand to hold the ball 32 of the return valve 29 against its seat and insufficient on the other hand to retain the ball of the suction valve 15 removed from its seat against the higher pressure on the other side of its seat. Starting with this situation, a pressure drop in the secondary conduit 28 through the return valve 29 takes place as follows: when the brake pedal is released only slightly, the master cylinder piston follows and the pressure in the primary circuit 27 is relieved. As a consequence, the return valve 29 opens slightly and the pressures in the primary and secondary circuits tend to equalize. However, the equalization process is not completed because the return valve 29 closes again as soon as a slight primary pressure has builtup. Only if the primary pressure is again lowered by further releasing the brake pedal, does the secondary pressure follow. As a consequence, therefore, during pressure reduction of the secondary pressure, the secondary pressure is a function of the volume of fluid expelled into the primary pressure circuit or of the travel of the master cylinder piston.

In order to provide the vehicle operator with a feel for the primary pressure so that he can sense the point of travel which the master cylinder piston has reached or, in other words, how high the secondary pressure is at a particular moment, a chamber 26 has been provided. The chamber 26 is connected to the secondary circuit 28 as shown. Thus, the secondary pressure acts at all times on the smaller cross section of the piston 24 within the chamber 26. As a result, the brake lever must be moved, as in the case of any normal braking system, with a force which is higher because of the higher secondary pressure, in order to balance the master cylinder piston.

This braking system has the special advantages of short duration and hysteresis-free response. For example, if the brake pedal is operated violently and the braking pressure rises comparatively quickly, this pressure will propagate immediately through the valves 15 and 16 to the secondary circuit 28 without the aid of the free piston pump, which itself operates very quickly. This results in a practically synchronous buildup of the pressure.

Finally, the operation of the known anti-skid system will be briefly described.

If a very high rotational deceleration occurs during braking of any wheel, which might give rise to locking of that wheel, first the corresponding inlet valve, e.g., 44, closes. Thus, the braking pressure at this wheel cylinder is maintained. If the rotational deceleration rises further, the outlet valve, e.g., 46, opens, allowing the brake pressure to be reduced through the suction valve of the return pump 48.

The pressure medium is then returned into the secondary circuit 28. Owing to the pressure drop, the wheel reaccelerates. As a consequence, the outlet valve 46 closes again but without the inlet valve 44 opening immediately. The brake pressure, therefore, remains, at this lower value until the acceleration has stopped.

Figure 3:
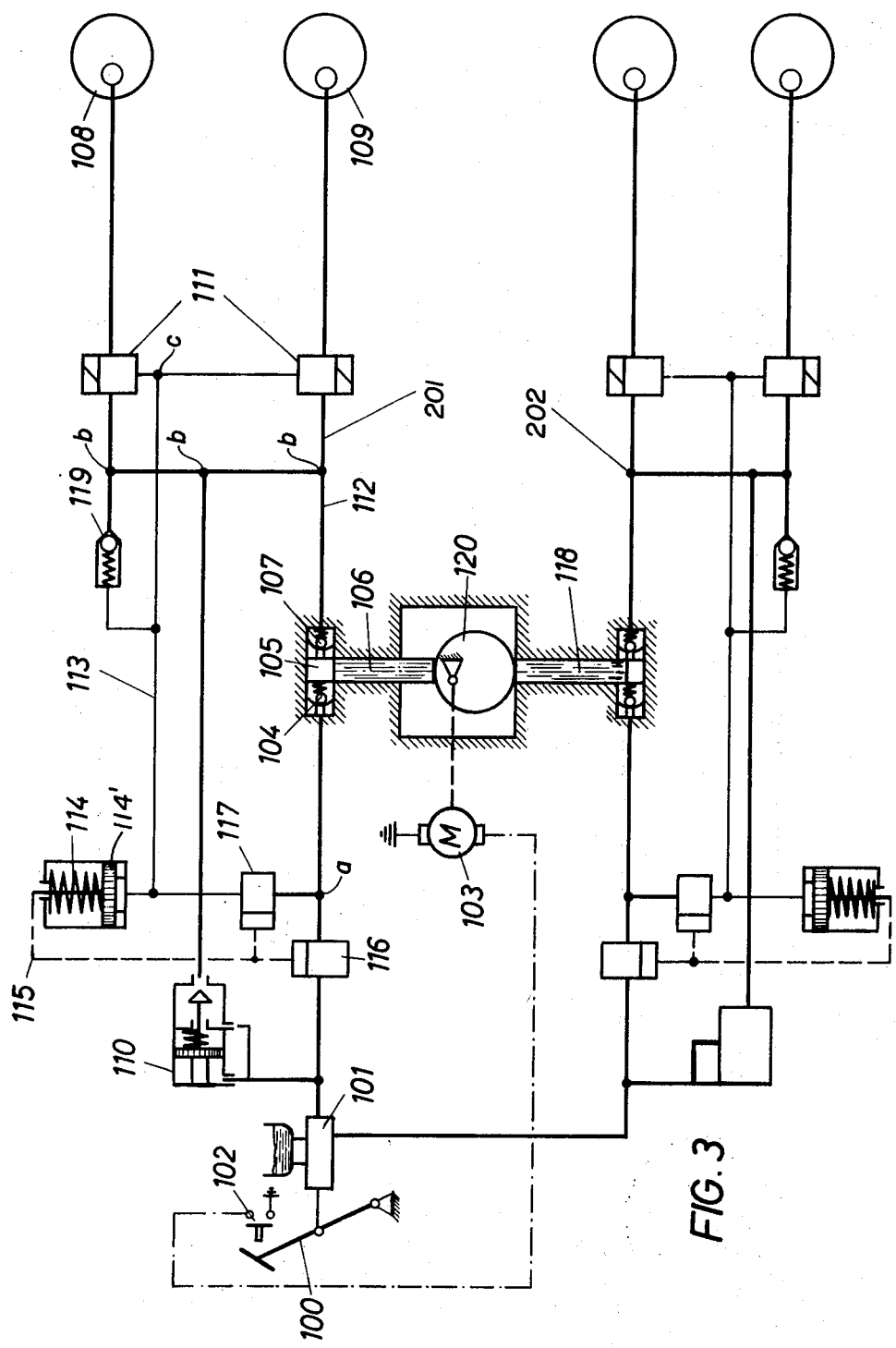
FIG. 3 diagrammatically illustrates an embodiment of the present invention with four wheel control.

In the anti-skid system described in the following when used in combination with the braking system of FIG. 1, an additional pump is necessary. According to the present invention it is possible to eliminate the need for such an additional return pump and to use the free piston pump for also returning the fluid. For this purpose, it is necessary to connect point c, between outlet-valves 46 and 47 of FIG. 1 with an accumulator, and to connect the accumulator with point a, a point between the cylinder 26 and the suction valve 15, via a valve means which, for example, is actuated in dependence upon of the stored volume in the accumulator. The valve means normally keeps the connection between the accumulator and the point a closed, but keeps the connection between cylinder 25 and suction-valve 15 open; when the accumulator is filled to a certain level the connection between the accumulator and point a is opened and the connection between cylinder 26 and point a is closed. Thus the free piston pump receives fluid from the accumulator for a certain period. The additional connections, valves, and the accumulator necessary for such a double use of the pump are shown in FIG. 3, i.e., parts 113 – 117. In addition, there is shown a relief valve 119 which is connected between point b, and the accumulator. This relief valve may also be used in the arrangement of FIG. 1.

Figure 4:
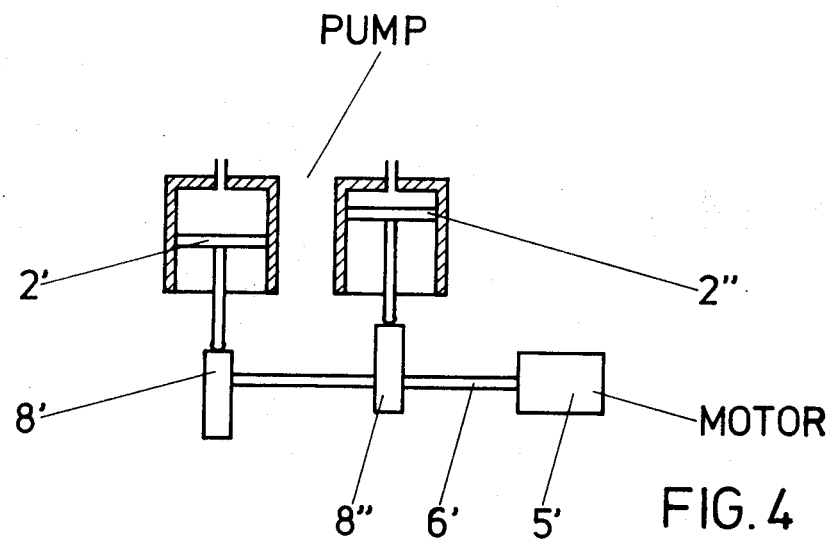
FIG. 4 diagrammatically illustrates an arrangement with two pumps and one drive for these pumps.

Every braking circuit requires its own delivery piston. Preferably the arrangement is similar, for example, to the case of a multiple piston pump for reducing the non-uniformity of the delivery pressure with pistons being arranged side by side with their axes parallel and their associated eccentrics located on the same drive shaft which in turn may be driven either by the motor 5 or mechanically by the engine of the vehicle. Such an arrangement is schematically shown in FIG. 4 where 5' is the motor, 6' its driving shaft, 8' and 8'' are two eccentrics mounted on the shaft and 2' and 2'' are two delivery pistons for two braking circuits. The eccentrics are angularly offset by 180° with respect to each other.

Figure 2:
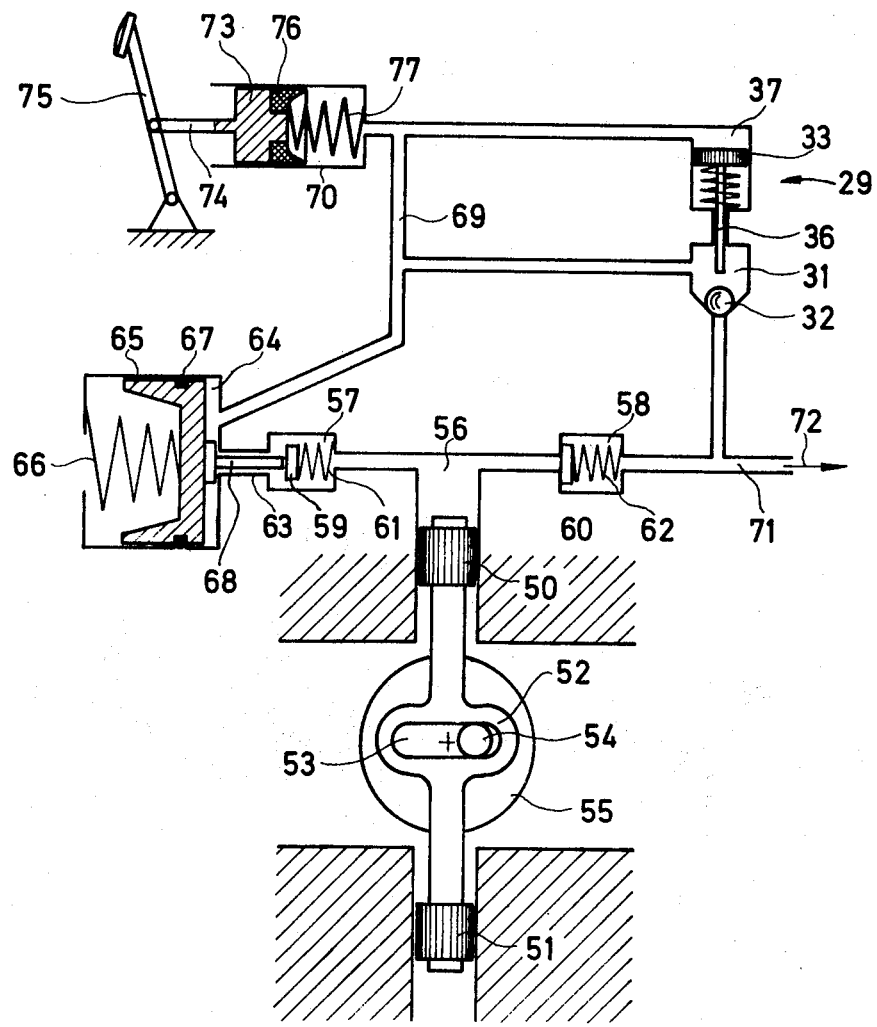
FIG. 2 diagrammatically illustrates a portion of one circuit of a two-circuit hydraulic brake servo with a conventional piston pump, wherein the closing element of the suction valve is controlled by the pressure in the primary circuit.

In the embodiment of FIG. 2 another pump is used, the two pistons 50 and 51 of which are rigidly interconnected through a cross loop part 52. A pin 54 is mounted eccentrically on a plate 55 and engages an oval window 53 of the cross loop 52. As in the previous embodiment of FIG. 1, the plate 55 must be rotated during the entire hydraulic operation. The pistons 50 and 51 move in two coaxial cylinders, of which only the top one is shown in full, forming chambers 56 with the pistons. Connected to the left side of the top chamber 56 is a suction valve 57, and to the right of the top chamber 56 a delivery valve 58 is connected. The valve closure members are shown at 59 and 60 and the valve springs at 61 and 62. From the suction valve 57, a connecting conduit 63 leads to a control chamber 64, in which a piston 65 is movable under the action of a spring 66. The piston 65 is sealed by an annular seal 67. In the inoperative position shown, the piston 65 is in a righthand position, so that a pin 68 which is mounted on the end face of the piston 65 moves the closure member 59 of the suction valve 57 to the right against its spring 61. The cross section of the connecting conduit 63 is such that fluid can flow therethrough in spite of the positioning therein of the pin 68. A primary conduit system 69 leads from the control chamber 64 to a metering or master cylinder 70 and to the chambers 31 and 37 of a return valve 29 which has already been described with reference to FIG. 1. On the other side, the chamber 31 of the return valve 29 and the delivery valve 58 of the pump are connected to the secondary circuit systems 71. An arrow 72 indicates the force of the secondary system acting on a load, for example a hydraulic braking system.

In the master cylinder 70, a piston 73 is moved by a brake pedal 75, shown diagrammatically, through the piston rod 74. The master cylinder piston 73 carries a sealing sleeve 76 of elastic material and a return spring 77 of comparatively large dimensions, so that an increasing pressure is experienced when the pedal 75 is operated.

The operation of the arrangement of FIG. 2 is as follows: in the non-pressurized inoperative state of the hydraulic system, the control piston 65 is so far to the right that its pin 68 keeps the valve closure member 59 of the suction valve 57 open. If the pump operates during this state of the valve closure member 59 it cannot develop any appreciable pressure for application to the secondary circuit because during the power stroke of the piston 50, the pressure fluid in front of the piston 50 is forced back through the open connection 63 into the control chamber 64. Although the control piston 65 is displaced slightly to the left against the force of its spring 66, the arrangement is such that the pin 68 is not withdrawn to such an extent that the valve closure member 59 engages its seat. The delivery valve 58 remains closed under the influence of the spring 62. The spring 62 is correspondingly dimensioned so that the valve 58 remains closed if, during the power stroke of the pump piston 50, pressure fluid flows into the control chamber 64 from the chamber 56. Thus, a volume of fluid is simply moved to and fro. The advantages of this noneffective, that is with respect to the secondary circuit, no-load operation are the same as in the first embodiment, i.e., an easy and, therefore, quick start of the pump drive and the avoidance of the formation of a vacuum in the chamber 56, thereby eliminating the risk of air entering the hydraulic system owing to defective sealing of the piston 50.

If the pedal 75 is now depressed, further pressure medium is pushed into the chamber 64 from the primary conduit 69. As a consequence, the control piston 65 moves beyond its left-hand end position (end position for no-load operation) further to the left. As a result the suction valve 57 closes thereby priming the system for a buildup of the secondary pressure. During the next power stroke of the pump piston 50, the suction valve 57 is closed and pressure fluid is pushed through the delivery valve 58, which now opens, into the secondary circuit 71. According to the position of the pedal 75 and of the control piston 65, several such normal power strokes are possible before a sufficient volume of pressure fluid has been taken from the control chamber 64 during the intake or suction stroke of the piston 50 which momentarily opens the suction valve 57, so that, during a further power stroke, the suction valve 57 no longer closes because the pin 68 has meanwhile moved back sufficiently far to the right to retain the valve 57 open. A further pressure increase in the secondary circuit 71 takes place only if the pedal 75 is operated further, thereby moving the control piston 65 slightly back to the left. Preferably, this embodiment also has, as has the embodiment of FIG. 1, suitable means for limiting the maximum pressure in the secondary circuit.

This limiting means can be identical to the means used in FIG. 1 plunger 3 and spring 4 in piston 2) or it can be a relief valve identical to the relief valve 119 of FIG. 3.

The pressure buildup takes place in a manner similar to the first embodiment by means of the return valve 29. With the movement of the master cylinder piston 73 to the left, the pressure in the primary circuit drops quickly because the control piston 65 will have moved immediately to the right, and possibly even reached its right-hand end position. The pressure drop releases the ball 32 of the return valve 29 only long enough for the pressure medium leaving the secondary circuit 71 to cause the primary pressure to recover. Thus, a pressure drop controlled by the brake pedal 75 is also possible. If the pedal is completely released, the secondary and primary pressures will balance each other.

Although contrary to the first embodiment, in that the secondary pressure cannot be directly sensed on the pedal 75, the return spring 77 provides an alternative means for sensing the secondary pressure because its spring characteristic can be selected to take into account the relationship between the secondary pressure and the piston of the master cylinder piston in each case.

It is apparent from the preceding statement that an additional return pump is necessary if an anti-skid control system is used with valve arrangements which permit the brake fluid to flow outwardly from the wheel brake if its associated wheel should show a tendency to lock. However, the present invention seeks to enable an additional return pump to be dispensed with.

For the case in which at least one valve arrangement is located in the secondary circuit arrangement, to lower the pressure affecting the brake by releasing brake fluid when at least one wheel exhibits a tendency to lock, an accumulator chamber is provided. The accumulator is situated in a feed line for returning the released brake fluid to the secondary circuit. The released brake fluid is fed into the accumulator chamber. Switching means are also provided which temporarily disconnect the connection between the master cylinder and the pump and makes a connection between the accumulator chamber and the pump, so that the pump can be utilized to return the accumulator fluid to the secondary circuit. For such a double use,*

For the double use proposed, the pump may be constructed as shown in FIG. 2, It would also be possible to utilize a pump which is coupled to a running drive even upon exertion of a small braking force, which the pump amplifies. The most favorable solution is the free piston pump according to FIG. 1. The amplification produced by the pump is here proportional to the volume of the pressure medium, corresponding substantially to an amplification which is a function of the travel of the brake pedal. * the same connections and insertion of parts as described in connection with FIG. 1 and shown in FIG. 3 have to be made.

FIG. 3 of the drawing shows a schematic representation of a further embodiment constructed according to the invention with four wheel control. A free piston pump similar to that shown in FIG. 1 is used. The construction and all the described modifications of FIG. 1 may be used and all details shown there are also applicable to this embodiment.

The brake pedal is shown in FIG. 3 at 100, the master cylinder on which it acts at 101. Two braking circuits 201 and 202 are shown and owing to the fact that both circuits are identical only the circuit shown at the top is explained in detail. During the operation of the brake pedal 100, the switch 102 is actuated and starts an electric motor 103 which is fed by the battery or the generator of the vehicle. The pump pistons 106 and 118 are so positioned that they are not moved by a driving eccentric 120 driven by the motor 103, when no brake fluid passes through the suction valves 104 into the cylinders 105 of the pump. Hence the pump 105, 106 delivers brake fluid only when brake fluid is first delivered into the cylinder 105 by depression of the brake pedal 100. Delivery of brake fluid into the cylinder 105 causes the piston 106 to move downwardly. The amplified pressure, which is achieved as a result of the power stroke of the piston 106, normally passes through the valve 107, to the wheel brakes 108 and 109 and causes the wheels associated therewith to decelerate. When the brake pedal 100 is released, a return valve 110 which corresponds to the return valves 29 of FIGS. 1 and 2, opens and the brake pressure at the wheels drops.

It should be mentioned that the amplification factor of the pump may be determined by suitably dimensioning the piston area of the return valve relative to the valve opening. In this case, a separate return of the secondary pressure may be omitted.

If, on the other hand, a tendency to lock occurs as a result of applying a braking force to the pedal 100, one or both anti-skid control valve arrangements (inlet and outlet valves, or a two-way valve) 111 respond and disconnect the brake cylinder or cylinders 108 and 109 from the conduit 112 and cause a pressure drop in the brake cylinder or cylinders by releasing hydraulic fluid into a conduit 113. This released brake fluid is stored in an accumulator 114. The spring biased piston 114' of the accumulator 114, which may obviously be constructed in other configurations than that shown, is displaced upwardly and controls, at a predetermined level, valves 116 and 117, e.g., through a mechanical or electrical connection 115. The valve 116 which is normally open will now be closed while the valve 117 which is normally closed will now be opened. In this way, the pump 105, 106 receives, for a period, fluid stored in the accumulator 114 instead of fluid from the master cylinder 101. When the accumulator 114 is again emptied, the valves 116 and 117 return to their original states. This, procedure ensures that brake fluid released through the outlet valves 111 returns to the brake circuit during controlled braking and that there is no need at the brakes for the brake fluid released. The two valves 116 and 117 may also be replaced by a two-way valve.

In order to avoid an excessive pressure with closed control valves according to the invention, a pressure relief valve 119 is provided between the conduit 112 and the accumulator chamber 114, opening, e.g., at 150 atmospheres and passing brake fluid to the accumulator 114 and from there, from time to time, at low pressure into the primary circuit.

Figure 5:
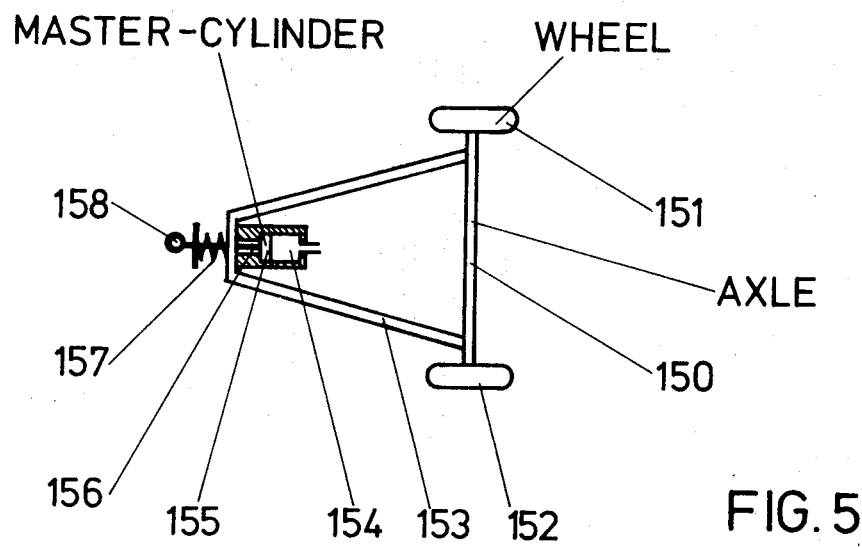
FIG. 5 diagrammatically illustrates the mounting of the master cylinder on the tongue of a trailer.

The brake system according to the present invention can also be used, for example, for trailers. In this case the primary force is the "tongue force" of the trailer or a force dependent thereon, i.e., the force with which the trailer pushes the towing vehicle through the tongue when the towing vehicle is braked. This force also effects braking of the trailer with the presently used vehicles. It is novel that this force, or a force derived therefrom acts on the master brake cylinder of the system of the present invention which is provided with a pump to augment the brake pressure and to return the pressure medium. Such an arrangement is shown in FIG. 5 in a schematic representation. There are shown the guided trailer-axle 150 and its two wheels 151 and 152. A tongue 153 is attached to the axle 150; a cylinder 154, in which a piston 155 is provided, is attached to the tongue 153. A shaft 156 is fixed to the piston. Under normal conditions the piston is held in the shown position. At 158 the tongue is connected to the towing vehicle. When the towing vehicle is braked the trailer pushes the towing vehicle and the piston 155 is moved to the right against the force of the spring 157. The cylinder 154/ piston 155 unit is used as master brake cylinder in the arrangement according to the invention for example in the arrangement of FIG. 3. Thus the trailer is braked.

It will be understood that the above description of the present invention is susceptible to various modifications, changes and adaptations, and the same are intended to be comprehended within the meaning and range of equivalents of the appended claims.

I claim:

1. A hydraulic brake servo arrangement for controlling the brakes of vehicles, comprising: a brake master cylinder; a pump connected to said brake master cylinder; a secondary circuit leading from said pump to at least one vehicle brake; said pump delivering, under the control of said master cylinder, brake fluid into said secondary circuit; an anti-skid system associated with the vehicle brake and including an accumulator chamber; and means for temporarily disconnecting said pump from said master cylinder and connecting said pump to said accumulator chamber so that said pump acts both as a brake servo unit and as a return pump for said anti-skid system.

2. A hydraulic brake servo arrangement for controlling the brakes of vehicles, comprising: a brake master cylinder having a piston which is movable to produce a primary pressure; a pump having an inlet feed, connected to said master cylinder, and a piston arranged to be acted upon by the primary pressure; a secondary circuit located between said pump and at least one vehicle brake, said pump delivering hydraulic fluid to the brake through said secondary circuit during the operation of said motor cylinder piston; a return valve connecting said secondary circuit with said inlet feed, said return valve being controlled by the primary pressure ; an anti-skid system associated with the vehicle brake and including an accumulator chamber; at least one release valve connected to said secondary circuit for lowering the braking pressure by releasing brake fluid into said accumulator chamber, if at least one of the vehicle wheels shows a tendency to lock; and means for temporarily disconnecting said master cylinder from said pump and making a connection between said accumulator chamber and said pump, so that the brake fluid released into said accumulator chamber can be returned to said inlet feed.

3. A brake servo arrangement as defined in claim 1, wherein the disconnection of said pump from said master cylinder and the connection of said pump to said accumulator chamber is effected at a predetermined stored volume of brake fluid in said accumulator chamber.

4. A brake servo arrangement as defined in claim 3, wherein said means includes a valve for disconnecting said master cylinder from said pump and a valve for making the connection between said accumulator chamber and said pump.

5. A brake servo arrangement as defined in claim 3, wherein said means includes a two-way valve for disconnecting said master cylinder from said pump and for making the connection between said accumulator chamber and said pump.

6. A brake servo arrangement as defined in claim 4, further comprising a mechanical link, wherein said accumulator includes a piston and wherein at least one valve is controlled through said mechanical link by said piston of said accumulator chamber.

7. A brake servo arrangement as defined in claim 5, further comprising a mechanical link, wherein said accumulator includes a piston, and wherein said two-way valve is controlled through said mechanical link by said piston of said accumulator chamber.

8. A brake servo arrangement as defined in claim 4, further comprising an electric circuit, wherein said accumulator includes a piston, and wherein at least one valve is operated by said electric circuit which is controlled by the position of said piston of said accumulator chamber.

9. A brake servo arrangement as defined in claim 5, further comprising an electric circuit, wherein said accumulator includes a piston, and wherein said two-way valve is operated by said electric circuit which is controlled by the position of said piston of said accumulator chamber.

10. A brake servo arrangement as defined in claim 4 further comprising at least one biased pressure relief valve, wherein said accumulator chamber communicates through said pressure relief valve with the inlet of said valve for disconnecting said master cylinder from said pump and said valve for making the connection between said accumulator chamber and said pump in such a way that brake fluid flows to said accumulator chamber when the pressure of the fluid in said secondary circuit exceeds a predetermined level.

11. A brake servo arrangement as defined in claim 1, further comprising at least one biased pressure relief valve, wherein said accumulator chamber communicates through said pressure relief valve with the secondary circuit in such a way that brake fluid flows to said accumulator chamber when the pressure of the fluid in said secondary circuit exceeds a predetermined level.

12. A brake servo arrangement as defined in claim 1 wherein said pump includes a piston, and wherein said piston comprises two parts which are elastically connected such that the pressure of the fluid in said secondary circuit can be limited.

13. A brake servo arrangement as defined in claim 1 further comprising an electric drive for said pump, and wherein said drive is supplied by the vehicle power source.

14. A brake servo according to claim 13 wherein said pump is provided with a drive having at least some duplicate parts.

15. A brake servo arrangement as defined in claim 1 wherein said pump is driven by an electric motor.

16. A brake servo arrangement as defined in claim 1 wherein said pump is a free piston pump.

17. A brake servo arrangement as defined in claim 1, further comprising a primary circuit; a valve; a pin mounted to engage said valve, wherein said pump is a piston pump with said valve forming part of said pump, and wherein the position of said pin relative to said valve is controlled by the volume of brake fluid in said primary circuit.

18. A brake servo arrangement as defined in claim 1, further comprising a primary circuit; a valve; a pin; and means for causing said pin to engage said valve, wherein said pump is a piston pump with said valve forming part of said pump, and wherein the position of said pin relative to said valve depends upon the pressure of the brake fluid in said primary circuit.

19. A brake servo arrangement as defined in claim 1, further comprising a drive, wherein a plurality of piston pumps are provided for an equal plurality of brake circuits, with each said piston being operated by said drive.

20. A brake servo arrangement as defined in claim 1, wherein said anti-skid system includes a plurality of valves arranged between said accumulator chamber and said brakes of at least two wheels, said valves being controlled by the tendency of said wheels to lock, and cooperating to release fluid from said brakes for delivery to said accumulator chamber.

21. A brake servo arrangement as defined in claim 1, wherein the arrangement is used to brake a trailer of a tractor - trailer vehicle and wherein the master cylinder is controlled by the force, with which the trailer pushes the towing vehicle when the tractor is braked.

* * * * *